April 23, 1957 H. E. POUELL 2,789,342
SPRING TOOL
Filed Feb. 16, 1953 2 Sheets-Sheet 1

H. E. Powell
INVENTOR
BY C. A. Snow & Co.
ATTORNEYS.

April 23, 1957 H. E. POUELL 2,789,342
SPRING TOOL
Filed Feb. 16, 1953 2 Sheets-Sheet 2
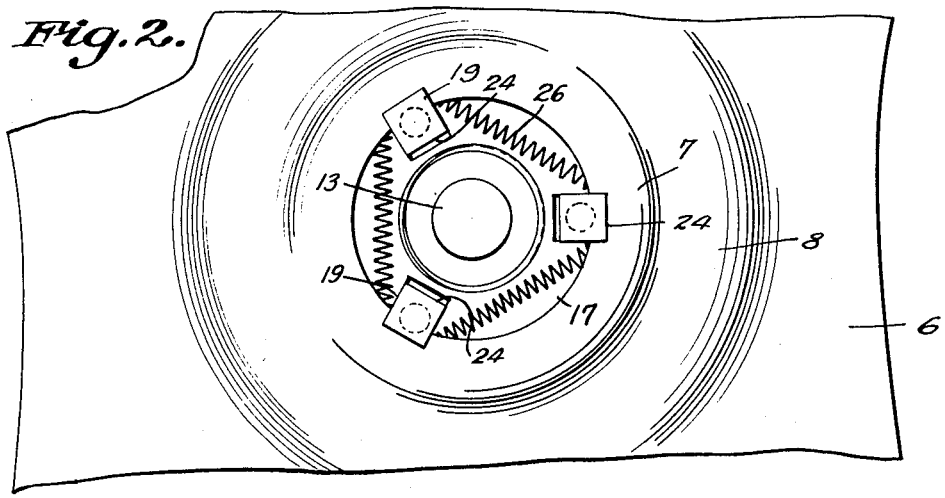
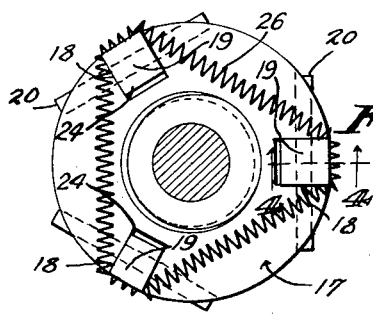
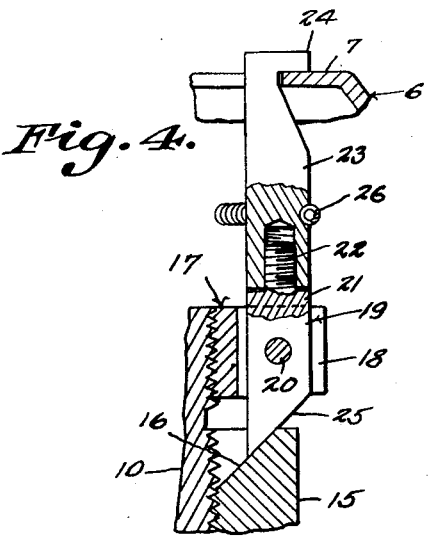
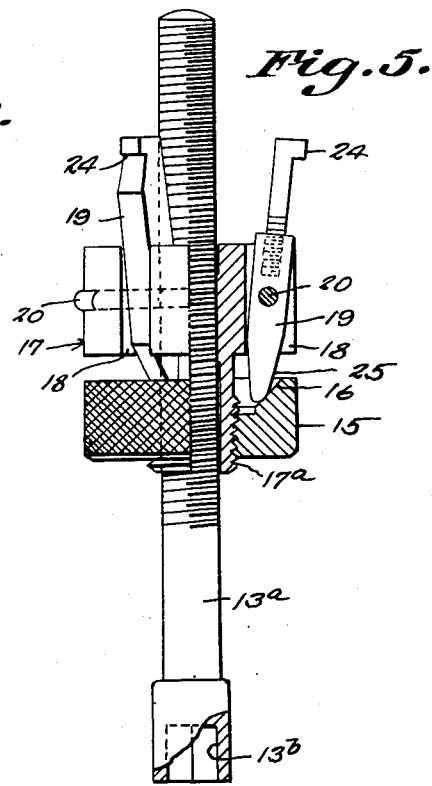
H. E. Pouell
INVENTOR
BY CASnow&Co.
ATTORNEYS.

United States Patent Office 2,789,342
Patented Apr. 23, 1957

2,789,342
SPRING TOOL

Harry E. Pouell, Logansport, Ind., assignor to Pouell Manufacturing Company, a corporation of Indiana Application February 16, 1953, Serial No. 337,126

1 Claim. (Cl. 29—252)

This invention relates to a tool or jack which is particularly adapted for use in facilitating the application of shims to the coil springs of an automotive vehicle. The modern automobile makes use of coil springs for resiliently supporting the car body relative to the frame or chassis at both the front and rear of the vehicle. These springs are very rugged and serve to support the entire weight of the car relative to the frame or chassis. It is quite desirable that the four springs have equal tension or strength in order that the body will ride level. Frequently one or more of such springs loses its proper tension so that the compressive strength will vary in which event it becomes necessary to provide shims at the top or at the bottom of the springs to properly adjust the same. This operation is difficult due to the inaccessibility of the springs and also due to the fact that considerable force is required to compress such springs to permit the insertion of suitable shims at the ends of the springs either at the top or the bottom. The embodiment of the invention herein disclosed is directed toward a tool which is particularly suited for use in applying shims to the lower side of the springs without removing the springs from their mountings.

I have designed a suitable tool for use in applying shims to automobile springs which is particularly well adapted for the purpose intended and which is preferably in the form of a jack which can be readily applied to the spring bearing plates and operated to compress the springs to permit the insertion of a shim at the bottom of the springs so as to adjust the tension or effective compressive strength of the spring.

The main object of the invention is to provide a spring tool which may be applied to a spring while it is in its normal position on the car and which may be operated to compress the spring and lift it from its bearing plate to permit the insertion of a shim at the bottom of the spring between it and its lower bearing plate.

Another object of the invention is to provide a spring tool which is in the form of a hydraulic or pneumatic jack which is well adapted for the purpose intended and which can be quickly and readily attached to or removed from the springs thereby greatly reducing both the time and labor required for adjusting the springs.

A further object of the invention is to provide a spring tool of the character described which comprises few parts which are of simple construction and well adapted for quantity production at relatively low cost.

Further and more limited objects of the invention will appear as the description proceeds and by reference to the accompanying drawings in which like parts are designated by similar reference characters.

Referring now to the drawings:

Fig. 2 is a fragmentary plan view showing my improved tool applied to the lower bearing plate of the spring.

Fig. 3 is a transverse sectional view taken substantially on the line 3—3 of Fig. 1.

Fig. 4 is a fragmentary vertical sectional view taken substantially on the line 4—4 of Fig. 3 and Fig. 5 is a view partly in elevation and partly in section showing a modified form of tool.

Figure 1:
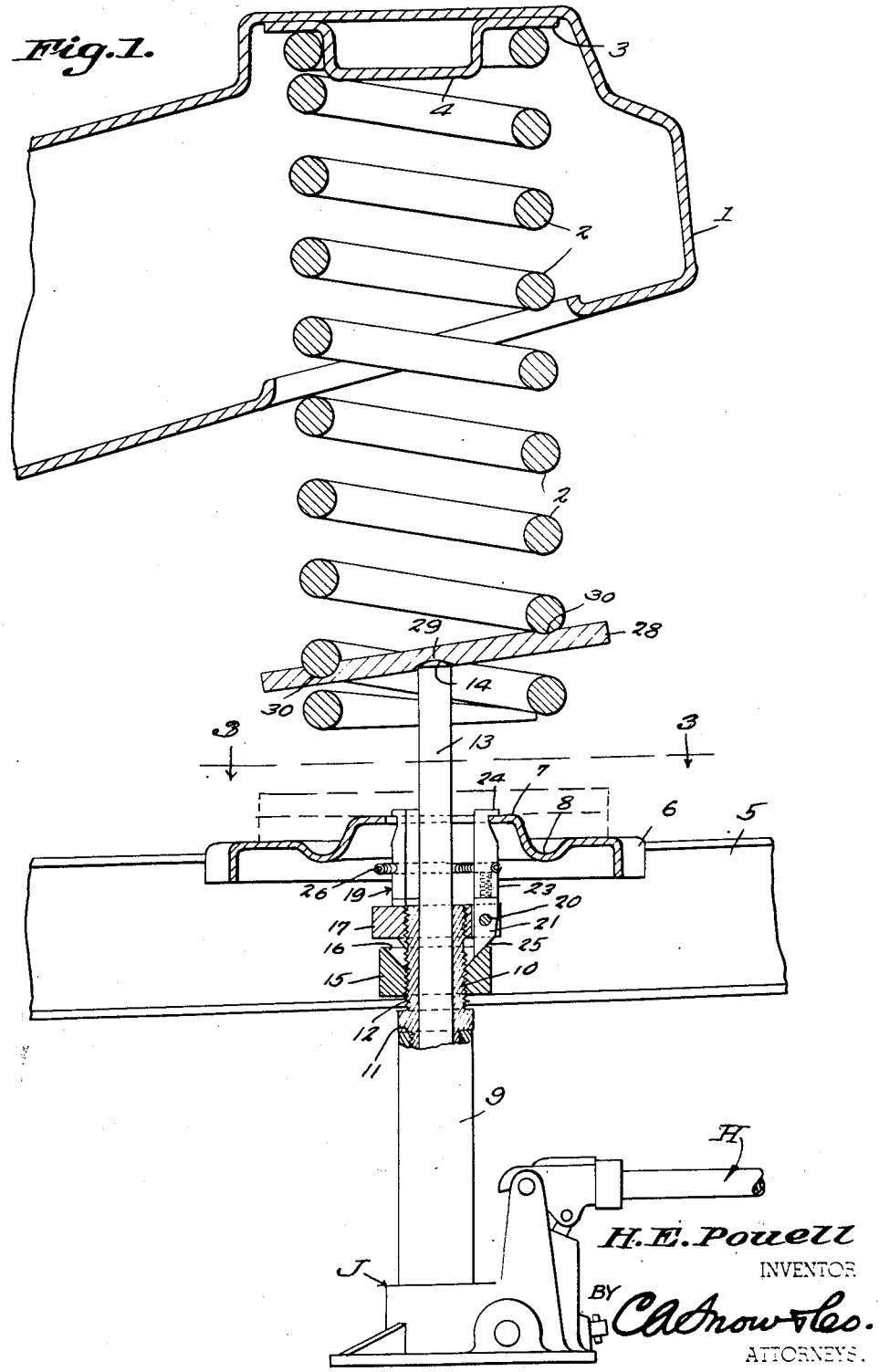
Fig. 1 is a view partly in elevation and partly in section showing my improved tool applied to the frame of an automotive vehicle in such a manner that it is possible to lift the spring away from its seat to permit the insertion of a shim.

Referring now to the drawings in detail, the reference character 1 designates the spring supporting and retaining arm of an automotive vehicle and which is shaped in section as shown most clearly in Fig. 1 and which receives the upper end of the coil spring 2 therein. Disposed within the arm 1 and welded or otherwise secured thereto is a bearing plate 3 which has a boss 4 formed thereon over which the upper end of the spring is received. The reference character 5 designates one of the frame members of the automobile chassis which receives and supports the lower end bearing plate on which the coil spring 2 rests. The reference character 6 designates the lowermost spring bearing plate which is secured to the frame in any suitable manner and is shaped in section as illustrated in Fig. 1 and comprises an upstanding central portion 7 surrounded by a contiguous annular groove 8 which normally receives the lower end of the coil spring therein. These coil springs frequently lose their tension due to wear or due to inherent imperfections therein and it becomes necessary to insert shims to compensate this defect. This is a difficult operation due to the inaccessibility of the spring mountings and also due to the fact that considerable force is required to compress the spring and lift it from its seat to permit the insertion of the shim as shown in dotted lines in Fig. 1. I have provided a very simple tool for this purpose which will now be described. This tool consists essentially of a pneumatic or hydraulic jack J which is provided with a handle H and which is of standard construction. The jack comprises a base portion from which extends a sleeve or housing 9 which is interiorly threaded at the top. Threadedly secured in the upper end of the sleeve 9 is a fillet 10 having an annular shoulder 11 thereon and which is exteriorly threaded as indicated at 12. The reference character 13 designates a post or extension which extends through the fillet 10 and has its upper end rounded as indicated at 14, the purpose of which will later appear. The extension or projection 13 is a part of the jack and is elevated thereby so that it is projected within the interior of the coil spring 2. Threadedly secured on the fillet 10 is a header member 15 shown in detail in Figs. 3 and 4 and having at its upper end a cutaway portion or groove providing an angular inclined surface 16 the purpose of which will later appear. Also threadedly secured on the fillet 10 just above the header 15 is a collar 17 having about its periphery a plurality of rectangular slots 18. Pivotally secured in each of the slots 18 is a dog 19 which is secured in place by a pin 20. Each of the dogs 19 comprises a lower section 21 having a threaded stud 22 thereon and to which is threadedly secured an upper section 23. The upper section 23 is shaped at its upper end to provide a hook portion 24 adapted to extend through an opening in the lower bearing plate 6 and to engage the adjacent edges thereof as shown in Figs. 1 and 4. The lower faces of each of the lower sections of each dog is inclined as indicated at 25 and engages the inclined surface 16 on the header 15. It will be seen that when the header 15 is moved toward the collar 17 the surface 16 engages the inclined surface 25 on the lower ends of the dogs and moves the upper ends of the dogs outwardly into engagement with the adjacent edge of the bearing plate 6. A coil spring 26 surrounds the upper ends of the dogs and moves the same toward each other to facilitate the insertion of the tool through the bearing plate. The reference character 28 designates a compression plate which has on its underside a circular depression or cavity 29 which receives therein the upper rounded end of the extension 13 so as to permit tipping of the plate. The upper surface of the plate 28 is provided with an annular groove 30 in which the coils of the spring engage as shown in Fig. 1.

When it is desired to insert a shim beneath the lower end of the spring 2, the car is elevated or jacked up to provide ready access to the lower side of the frame and the lower bearing plates 6. The body of the car is also jacked up to take the weight off of the spring to be adjusted. The tool is then inserted in the position shown in Fig. 1 and the jack handle H operated to elevate the extension of the plunger 13. Of course the plate 28 is previously inserted between the coils of the spring adjacent the lower end thereof. As the plunger is elevated, the plate 28 is forced upwardly to compress the spring and lift it off of the bearing plate 6. The jack is supported only from the frame during this operation. The shims are in the form of a split ring and may be readily secured in place as shown in dotted lines in Fig. 1. After the shim is secured in place, the jack is removed and the parts permitted to assume their normal position. Due to the tilting movement of the plate 8 the spring will be readily compressed even though disposed at an angle. In some cars the entire spring is disposed at a sharp angle to the vertical and the lower plate is supported by a pair of spring supporting arms or brackets. In any case the jack is secured immediately below and in line with the opening in the lower bearing plate. It will thus be seen that the tool is supported by means of the hooks 24 from the bearing plate 6 and the pins downwardly therefrom and is disposed in axial alignment with the vertical axis of the spring. When the jack is operated to advance or elevate the post or extension 13, the compression plate 28 is also elevated to compress the spring and lift it from the bearing plate 6 in the position shown in Fig. 1 so as to permit the insertion of the shim. One form of spring or testing ring is disclosed in my co-pending application Serial No. 325,597 filed December 12, 1952. However my tool is adapted for use with all standard types of shims or tensioning rings which are used for the purpose herein described.

In Fig. 5 there is disclosed a slightly modified form of tool which does not require the use of a jack. In this form of the invention the collar 17 is provided with a downwardly extending skirt portion 17a which is exteriorly threaded and receives thereover the header 15. The rod or extension 13 is replaced by an exteriorly threaded rod 13a which extends through the header 15 and is threadedly engaged with the collar 17. The lower end of the rod 13a has a tool receiving recess 13b therein for receiving a tool by means of which the rod is turned to advance the same relative to the collar. In other respects this form of the invention functions and operates in the same manner as that form of the invention illustrated in Figs. 1 to 4 inclusive. It will now be clear that I have provided a tool which is well adapted for facilitating the application of shims or testing rings to the springs of an automobile and which will accomplish the objects of the invention as hereinbefore stated. The embodiments of the invention herein disclosed are to be considered merely as illustrative and not in a limiting sense as various changes may be made in the details of construction and arrangement of parts without departing from the spirit of my invention. The invention is therefore limited only in accordance with the scope of the appended claim.

What is claimed is:

In a tool for compressing a coil spring in an automotive vehicle wheel suspension, wherein the coil spring is disposed between an upper retaining arm and a lower apertured bearing plate; the combination of a cylinder housing provided with external threads at its upper end, a piston rod slidably mounted within said housing, a collar threadedly engaging said housing, a plurality of spaced dogs movably carried by said collar, each of said dogs including an inner portion pivotally mounted on said collar and an upper apertured portion threadedly and adjustably engaging said inner portion, each of said dogs having an inclined cam surface at its lower end and a hook at its upper end, spring means engaging said dogs for holding the dogs in normal retracted position on their pivotal mountings for projection through the aperture in said bearing plate, an annular header member threadedly engaging said housing beneath said collar, said header member having an annular inclined surface on the upper end thereof engageable with the inclined surfaces of said dogs to pivotally move the upper hook portions of the latter into engagement with said bearing plate surrounding said aperture therein, a compression plate supported on the upper end of said piston rod to permit relative angular movement therebetween, said compression plate being insertable between the convolutions of said coil spring for engagement with said rod inserted axially through said spring for elevating and compressing the spring, the aforesaid two-part construction of said dogs providing means for adjusting the effective length thereof whereby said piston rod may be disposed in angular relation to said bearing plate and coincident with the axis of said coil spring.

References Cited in the file of this patent
UNITED STATES PATENTS

| | | |
|---|---|---|
| 1,376,340 | Klay | Apr. 26, 1921 |
| 1,473,075 | Bates | Nov. 6, 1923 |
| 1,795,487 | Grady | Mar. 10, 1931 |
| 2,376,721 | Piper | May 22, 1945 |
| 2,652,625 | Perkins | Sept. 22, 1953 |